(12) United States Patent
Lee et al.

(10) Patent No.: US 8,571,920 B2
(45) Date of Patent: Oct. 29, 2013

(54) OPTIMAL LIST-PRICE MECHANISM DESIGN FOR MULTI-LEVEL DEVICE CLICK-THROUGH IN TARGETED PRINT OR ELECTRONIC COMMUNICATION

(75) Inventors: Haengju Lee, Webster, NY (US); Shanmuganathan Gnanasambandam, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 364 days.

(21) Appl. No.: 12/897,887

(22) Filed: Oct. 5, 2010

(65) Prior Publication Data

US 2012/0084143 A1    Apr. 5, 2012

(51) Int. Cl.
*G06Q 30/00* (2012.01)

(52) U.S. Cl.
USPC ........................................... 705/7.35

(58) Field of Classification Search
None
See application file for complete search history.

(56) References Cited

U.S. PATENT DOCUMENTS

| | | | |
|---|---|---|---|
| 5,918,209 A * | 6/1999 | Campbell et al. ............... | 705/5 |
| 7,653,561 B2 * | 1/2010 | Bergstrom .................... | 705/7.22 |
| 7,895,116 B2 * | 2/2011 | Chatter et al. ................. | 705/37 |
| 7,908,164 B1 * | 3/2011 | Verma et al. .................. | 705/7.35 |
| 2001/0014868 A1 * | 8/2001 | Herz et al. ...................... | 705/14 |
| 2001/0051932 A1 * | 12/2001 | Srinivasan et al. ............ | 705/400 |
| 2002/0055865 A1 * | 5/2002 | Hammann ....................... | 705/7 |
| 2006/0277135 A1 * | 12/2006 | Jain et al. ...................... | 705/37 |
| 2007/0061240 A1 * | 3/2007 | Jain et al. ...................... | 705/37 |
| 2007/0078790 A1 * | 4/2007 | Kalyan ........................... | 705/80 |
| 2009/0030829 A1 * | 1/2009 | Chatter et al. ................. | 705/37 |
| 2009/0132348 A1 * | 5/2009 | Bria et al. ....................... | 705/10 |
| 2009/0150365 A1 | 6/2009 | Chow | |
| 2009/0157650 A1 | 6/2009 | Chow | |
| 2009/0313060 A1 | 12/2009 | Evevsky | |
| 2010/0008486 A1 | 1/2010 | Umeda | |
| 2010/0088178 A1 | 4/2010 | Gnanasambandam | |
| 2010/0149572 A1 | 6/2010 | St. Jacques | |
| 2010/0150588 A1 * | 6/2010 | Kaneyama et al. ............ | 399/45 |

OTHER PUBLICATIONS

U.S. Appl. No. 12/761,985, Gnanasambandam.
U.S. Appl. No. 12/486,951, Gnanasambandam.
U.S. Appl. No. 12/424,820, Gnanasambandam.
U.S. Appl. No. 12/424,858, Gnanasambandam.
U.S. Appl. No. 12/480,558, Partridge.
U.S. Appl. No. 12/603,999, Liu.
U.S. Appl. No. 12/533,901, Harrington.
U.S. Appl. No. 12/780,543, Gnanasambandam.
U.S. Appl. No. 12/540,051, Liu.

* cited by examiner

*Primary Examiner* — John G Weiss
*Assistant Examiner* — Christopher Stroud
(74) *Attorney, Agent, or Firm* — Simpson & Simpson, PLLC

(57) ABSTRACT

A method for optimizing a price for delivering at least one communication from an advertiser to a consumer, the method including (a) defining an advertisement product with at least one parameter, (b) obtaining a demand curve for the advertisement product, (c) calculating a first profit function as a function of the demand curve, (d) determining a first price at a maximum of the first profit function, (e) determining a second price at a point on the first demand curve corresponding to a capacity of communications that can be delivered to the consumer, and (f) determining a greater of the first and second prices as an optimal price.

2 Claims, 5 Drawing Sheets

OPTIMAL LIST-PRICE MECHANISM DESIGN FOR MULTI-LEVEL DEVICE CLICK-THROUGH IN TARGETED PRINT OR ELECTRONIC COMMUNICATION

INCORPORATION BY REFERENCE

The following co-pending applications are incorporated herein by reference in their entireties: U.S. patent application Ser. Nos. 12/761,985, filed Apr. 16, 2010; 12/780,543, filed on May 14, 2010; 12/603,999 filed Oct. 22, 2009; 12/540,051, filed Aug. 13, 2009; 12/533,901, filed on Jul. 31, 2009; 12/486,951, filed on Jun. 18, 2009; 12/480,558, filed on Jun. 8, 2009; 12/424,858, filed Apr. 16, 2009; 12/424,820, filed on Apr. 16, 2009; and, 12/335,048, filed Dec. 15, 2008. The following published applications are also incorporated herein by reference in their entireties: United States Patent Application Publication Nos. 2010/0088178, published Apr. 8, 2010; 2010/0005486, published Jan. 7, 2010; 2009/0313060, published Dec. 17, 2009; 2009/0157650, published Jun. 18, 2009; and, 2009/0150365, published Jun. 11, 2009.

TECHNICAL FIELD

The presently disclosed embodiments are directed to a method and system for optimizing the price of an advertisement product or on-demand personalized advertisement campaign.

BACKGROUND

Some methods of providing on-demand printed or electronic communications, commonly advertisements, are known. For example, in United States Patent Publication No. 2010/0088178 methods of generating on-demand personalized print communications was proposed. Generally, as taught in the references incorporated herein, in an on-demand advertisement campaign, when there is a print or display request by users, keywords or hypernyms are generated by an advertisement aggregator based on the title, metadata, or text of a document and any additional user, consumer, or advertiser chosen information. At the same time, relevant user/consumer history and stored content related to the user is accessed from a database and used in the keyword generation process. The time, location, and user information can be sent together to advertisers or advertisement brokers or aggregators with the keywords. Advertisements related to the identified keywords, time, location, or any other data are selected and sent to the multifunction device and are printed/displayed along with the item requested by the user, such as a receipt, webpage, email, text message, instant message, document, credit card or bank statement, coupon, ticket, etc.

In addition, a method of giving feedback effectively to advertisers about their advertisements was proposed in co-pending U.S. patent application Ser. No. 12/761,985. The method of giving feedback is called print click-through ("PCT"), which is an alternative to "charge-per-click" online advertising pricing schemes (i.e., an online aggregator charging an advertiser for each click made on a hyperlink associated with the advertiser or the advertiser's goods or services). PCT methods could be utilized to track advertisements delivered to a user browsing advertisements on the internet using a personal computer, laptop, internet enabled cell phone or other communication device. Accordingly, PCT methods are applicable not only to physically printed documents, but also analogously applicable as device click-through ("DCT") methods for other devices, such as electronically "printed" communications (e.g., electronic displays of communications). Thus, click-through may alternatively be referred to as device click-through but it should be understood that the terms DCT and PCT are interchangeable because DCT includes PCT, and PCT methods are easily adaptable for non-print devices. Several levels of PCT or DCT can be constructed depending on click-through speed, security level, the existence of user actions involved in promotional material and localization guarantees for user and device, as described in the incorporated references.

Currently, in advertising schemes, the cost of an advertising campaign is determined as fixed prices, by the size of the advertisement, or by the number of impressions. For example, an online advertisement aggregator may charge advertisers a fixed price for each click on a hyperlink or each view of a webpage associated with the corresponding advertiser (cost-per-click and cost-per-view advertising schemes), regardless of the advertiser of product/service being advertised. As another example, a newspaper may charge based solely on the physical size of the ad in the newspaper. As yet another example, a print shop may charge solely based on the number of pages printed. None of these currently utilized advertisement pricing schemes take into account other information which may be important in forming an optimal price for an advertising campaign that reflects the market value of the advertisement campaign and reflects the actual benefit delivered to the advertiser.

For example, in these prior art schemes, such as cost-per-click, or direct mailing campaigns of printed advertisements, an advertiser may spend a lot of money unnecessarily for delivery of advertisements to consumers who are completely uninterested in the advertisements (e.g., thousands of users may visit a webpage having an advertisement that is only directed or relevant to a limited group of consumers having a very particular need). In some cases, especially if cost-per-click or cost-per-view are the only available methods of advertising, many advertisers will simply choose not to advertise because they can not target their advertisements to primarily interested consumers, and therefore end up spending money on advertisements which are delivered to uninterested consumers. However, there is also a need for the aggregator to receive fair compensation for more accurate delivery of advertisements to interested consumers.

SUMMARY

Broadly, the methods discussed infra provide methods for optimizing a price-list for a variety of advertisements or communications. According to aspects illustrated herein, there is provided a method of optimizing a price for delivering at least one communication from an advertiser to a consumer, the method including (a) defining an advertisement product with at least one parameter, (b) obtaining a demand curve for said advertisement product, (c) calculating a first profit function as a function of said demand curve, (d) determining a first price at a maximum of said first profit function, (e) determining a second price at a point on said first demand curve corresponding to a capacity of communications that can be delivered to said consumer, and (f) determining a greater of said first and second prices as an optimal price.

According to aspects illustrated herein, there is provided a method for differentiating prices for delivering at least one communication from an advertiser to a consumer, the method comprising: (a) defining a first advertisement product with at least a first set of parameters, (b) defining a second advertisement product with a second set of parameters, the second set of parameters different from the first set of parameters, (c)

obtaining a first demand curve the first advertisement product and a second demand curve for said second advertisement product, (d) determining a first optimal price for the first advertisement product by analyzing a first demand curve for the first advertisement product, a capacity of the communications which can be delivered to the consumer, or combinations thereof, (e) determining a second optimal price for the second advertisement product by analyzing a second demand curve for the second advertisement product, the capacity of the communications which can be delivered to the consumer, or combinations thereof, (f) collecting the first optimal price from the advertiser when the communication is delivered to the consumer if the first set of parameters is met or the second optimal price from the advertiser when the communication is delivered to the consumer if the second set of parameters is met.

A method for optimizing a price for delivering at least one communication from an advertiser to a consumer, said method comprising (a) defining an advertisement product with at least one parameter, (b) obtaining a demand curve for said advertisement product, (c) calculating a first profit function as a function of said demand curve, (d) calculating a second profit function as a function of a capacity of communications that can be delivered to said consumer, (e) determining a first price at a maximum of said first profit function, (f) determining a second price at an intersection of said first profit function with said second profit function, and (g) determining as an optimal price a greater of said first and second prices.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
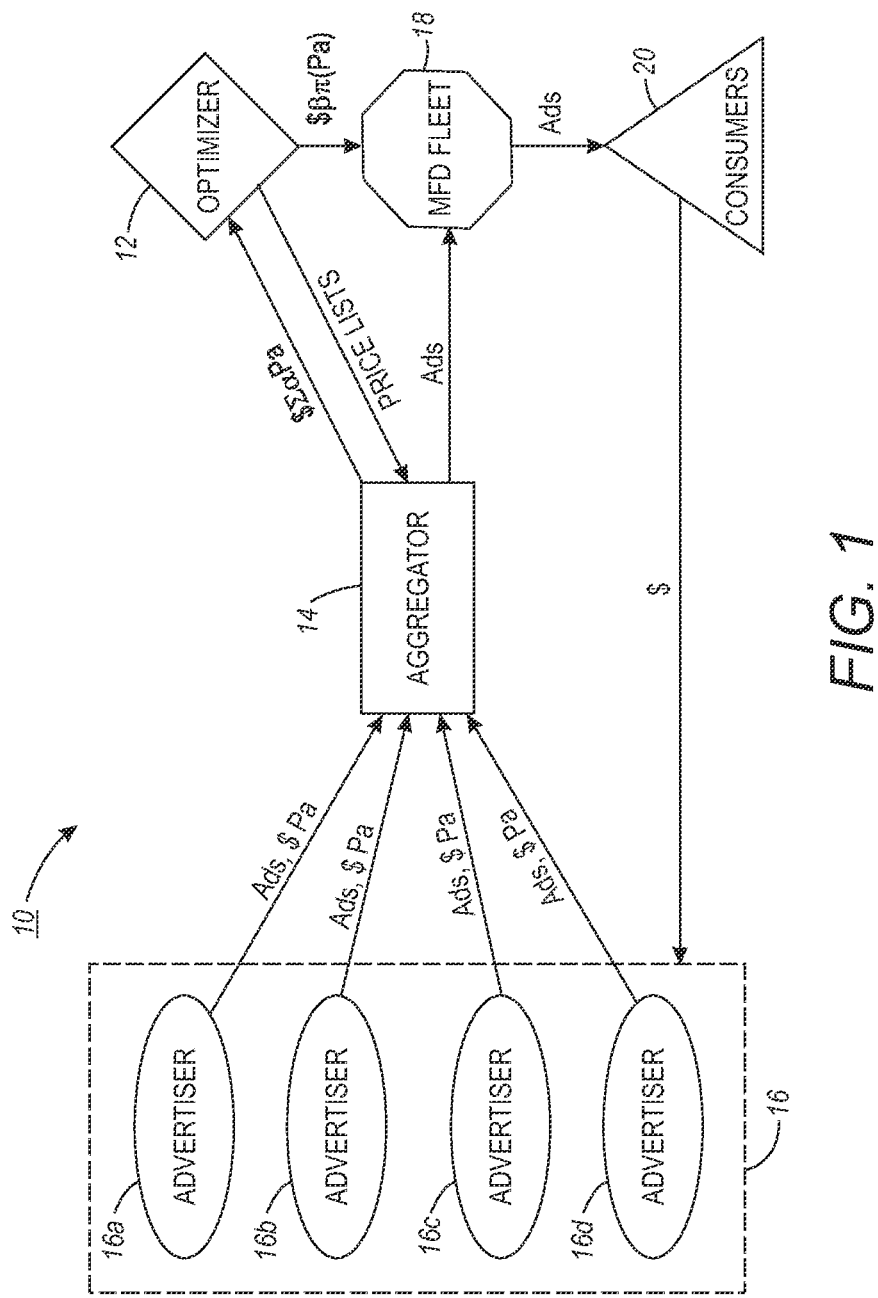
FIG. 1 is a schematic view of an advertising environment.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "advertiser" means any individual, agency, organization, facility, corporation, or other entity which desires to communicate some message to consumers, with the message commonly, but not necessarily, regarding the goods, services, or other activities offered by the advertiser. "Consumers" means any individual or entity which desires to receive the advertiser's communications, or which the advertisers desire to target for delivery of the communications. The terms "message", "communication", and "advertisement" are intended to be synonymous and broadly defined, including, for example, a print or electronic advertisement, a personalized message, an information feed, a sales alert, a coupon, an event listing, directions, a map, etc. Although the detailed description is directed primarily to aspects related to advertising and advertisement communications, one of ordinary skill in the art will appreciate that a variety of other modes of communication also fall within the spirit and scope of the claims. The message or communication may take the form of a printed document, a visual display, and/or an audio signal. As used herein, "aggregator" is the system, individual, agency, organization, and/or entity which provides, operates, or controls the means by which the advertisers can communicate with the consumers. Thus, "aggregator" is intended to broadly include all of the software and computer hardware which is used to automate certain functionality or steps, or to transmit, compare, analyze, or receive data, particularly in response to consumer or advertiser input. For example, the aggregator may be owned or run in collaboration with an online advertisement aggregator such as Yahoo or Google. By "computer," "PC," "computing device," or "computer hardware" it is generally meant any analog or digital electronic device which includes a processor, memory, and/or a storage medium, including peripherals such as monitors, mice, keyboards, etc., for operating or executing software. "Optimizer" means the system, individual, agency, organization, and/or entity which analyses data to create optimized prices for various advertisement products, which advertisement products are then offered to advertisers by the aggregator. Thus, "optimizer" is intended to broadly include all of the software and computer hardware which is used to automate certain functionality or steps, or to transmit, compare, analyze, or receive data, particularly in response to consumer or advertiser input. However, it should be understood that terms such as 'optimal,' 'optimize,' etc., shall be interpreted broadly to refer to a price or other result that is better, given a set of desired conditions, than other results that would be reasonably obtainable under similar conditions and reasonable, practical user demands. The terms "optimize" and "optimal" should not be construed to require a mathematically provable optimal result or solution. Thus, while the optimizer aims to find the best solution, if possible, this may not always be a realistically achievable goal and is accordingly not required by the methods described herein. An "advertising product" as used herein, refers to one of the various individual advertisement services which may be provided by the aggregator (e.g., advertisement campaign options which an advertiser can purchase from an aggregator). As described further herein, each advertisement product is determined by evaluating not only the size and/or number of impressions of the advertisement, as in traditional advertising, but also the goods or services related to the advertisement, the consumer receiving the advertisement, or any other parameters which enable the aggregator to more accurately target relevant consumers for the advertisers. In some embodiments the optimizer and the aggregator are the same entity.

"Multi-function device" and "MFD" as used herein is intended to mean a device which includes a plurality of different imaging devices, including but not limited to, a printer, digital copier, facsimile machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions or display monitors, recording and/or reproducing media or any other type of consumer or non-consumer analog and/or digital electronics. By "fleet" it is meant a collection of MFDs which are preferably in communication which each other, such as through a network or the internet. "User" is generally interchangeable with "consumer", particularly when the consumer is using an MFD.

Furthermore, as used herein, "click through" is intended to mean feedback, Moreover, "print click through" or "PCT" is intended to mean a single feedback transmission, emanating from the printer/MFD or printer/MFD driver, that is provided to the advertiser or advertising aggregator. Thus, "print click through" is defined as a form of verification provided by the printer/MFD to the advertisers and there are several levels of verification provided depending on the multitude of actions performed by the user or device. Similarly, device-click through (DCT) is an analogous form of verification that is necessary to provide value added services to interested parties, e.g., content providers, thereby encouraging the interested parties to continue utilizing the variety of communication forms (e.g., printed documents, electronic displays, etc.). For example, when the user retrieves an advertisement, the user may immediately place a mark, glyph, or symbol, on the paper and scan, fax, or hand it back to an MFD, an advertiser, or a store affiliated with an advertiser. The click-through process may then provide some functionality to incentivize the scanning/faxing/hand-over process, such as a discount on the advertiser's goods or services. If the advertisement is a banner on a webpage, the MFD notes the position of the mark and then emails the original advertisement and more relevant ads based on the expressed preference through the marking on the advertisement (e.g., the MFD determines which of a number of check boxes are marked, and performs an option corresponding to that checkbox). Regardless of whether or not an incentive is provided, the MFD sends information that a mark was placed on a certain ad and forwards this information to the advertiser and/or aggregator as a "click through". In some aspects, an email can also be sent to the user which contains a link that can be clicked, thereby further connecting the advertisers and the users. Other examples of print and device click through are described in the incorporated references.

Although any methods, devices or materials similar or equivalent to those described herein can be used in the practice or testing of these embodiments, some embodiments of methods, devices, and materials are now described.

According to the definitions above, the presently described embodiments provide methods to optimize prices for advertisement products related to on-demand electronic, online, or print marketing campaigns. An on-demand campaign can be designed, administered, tracked and improved from a central location or a distributed node (e.g., the aggregator), that is in data communication with a fleet or collection of multi-function devices (e.g., kiosks, computer terminals, display devices, etc.). Non-standard click-through indicators (see the incorporated references) such as presence, inquiries, visits, time-spent at store, etc., can be tracked via DCT.

In the shown schematic of FIG. 1, environment 10 is shown including optimizer 12, aggregator 14, advertisers 16, MFD fleet 18, and consumers 20. Traditionally, the aggregator collects advertising material from advertisers 16 and distributes it to consumers 20, such as through MFD fleet 18, in exchange for payment from the advertisers. In the shown embodiment four advertisers 16a, 16b, 16c, and 16d are shown, although it should be appreciated that any number of advertisers may be associated with aggregator 14. As defined above, the MFDs are any electronic device that enables at least some interaction between a consumer and an advertiser for transmission of an advertisement or communication to consumers (e.g., computer, cell phone, television, monitor, printer, speaker, etc.). According to the embodiment of FIG. 1, before collecting advertisements from the advertisers, aggregator 14 receives a list of prices for advertisement products from optimizer 12.

Environment 10 is arranged to provide consumers 20 with on-demand and personalized advertisements for products, services, etc. Aggregator 14 is used to facilitate the collection of advertisements from advertisers 16 and the on-demand delivery of advertisements to the consumers. By "on-demand" and "personalized" it is meant that the delivery of the advertisements is based on or related to an input or action of the consumer, typically in real-time, such as into a computer, laptop, cell phone, or other MFD. It should be appreciated that the action performed by the consumer could be explicitly requested by the consumer, such as purposefully performing a keyword search, clicking a link, etc., or it could be implicitly determined or interpreted by the optimizer, such as from the past history of the consumer, the time of day, geographical location, text or metadata associated with a document or electronic file retrieved, scanned, accessed, opened, or shared by the consumer, etc. Thus, it is generally meant that "explicitly requested" means that it is the consumers desire and intent to receive advertisements, while "implicitly requested" means that the optimizer or aggregator determines from the actions, history, documents, files, and any other known information of the consumer that certain advertisements would probably be of interest to the consumer. For example of an explicit request, the consumer could perform a search for shoes, such by using a computer to type the word "shoes" into a search box for a search engine on the internet, and in addition to search results, advertisements related to shoes could be directed to the consumer from the aggregator. For example of an implicit request, the consumer could request to print a document having the word "shoes" in the title, metadata, or body of the document, and the aggregator could scan the document to identify word "shoes" and accordingly print an advertisement for shoes along with the document.

The purpose of optimizer 12 in environment 10 is to find optimal market prices for each communication category or advertisement product in order to maximize the revenue or profit of the aggregator while also offering the advertisers flexible advertising options to more accurately target certain groups or demographics of consumers. It should be appreciated that in various embodiments, aggregator 14 and optimizer 12 could be the same entity, optimizer 12 could be owned or controlled by aggregator 14, the optimizer and aggregator could be separate entities, etc. The price list generated by optimizer 12 determines an optimal market price for each advertisement product. As described above, in traditional advertisement pricing schemes, the cost charged by the aggregator is generally based solely on one variable of the advertisement itself (e.g., number of times advertisement hyperlink is clicked, number of times a website is accessed which includes the advertisement, size of newspaper advertisement, number of printed advertisements mailed, etc.).

These traditional methods fail to take into account a variety of other factors that can be used to optimize the price of advertisement products. That is, in an on-demand personalized advertising environment, such as environment 10, advertisers may have different valuations for each unique advertisement product, considering that each advertisement product is constructed as a composite of various marketing factors, with each of the factors corresponding to different values to the advertisers.

For example, in one embodiment six marketing factors are utilized in order to define various advertisement products, including: (1) level or degree of device/print click-through methods utilized (e.g., see incorporated references), (2) placement of the advertisement on the electronic display or printed document (e.g., header, side margin, footer, in-line with text), (3) keywords/hypernyms related to goods or services (e.g., shoes, toys, books, clothes, dining, etc.), (4) time (e.g., morning, noon, afternoon, night, etc.), (5) location (e.g., New York, Texas, metropolitan, rural), and/or (6) consumer demographics (e.g., female, male, 18-25 years old, 25-35 years old, etc.). In addition to combinations of these six factors, it should be appreciated that any other relevant factors, such as related to marketing, demographics, consumer history, etc., could be used in determining the different advertisement products.

Each keyword may have different valuation from the view point of advertisers. For example, keywords related to shoes may be more valuable than keywords related to books due to the higher margin for shoes, competitiveness of the fields, etc. Therefore, advertisers are willing to bid more for keywords related to shoes than those related to books. For this reason, each keyword or set of related keywords results in a different advertisement product which can be individually purchased by advertisers. For example, advertisers may also place higher values on the different levels of DCT for providing more detailed and faster feedback of consumer use of advertisements. Also, an advertisement that is more visible by virtue of being placed ideally on paper or display "real-estate" may have higher value than one than that is shown in a more transient manner (e.g., advertisements printed/displayed centrally in-line with the text or images of the document are likely to attract more attention, and therefore be more valuable than advertisements which are only in the margins. Likewise, meta-data such as time, location, demographics, prior history of printed advertisements use (such as coupons used by each individual consumer), etc. may all have financial value to the advertiser. For example, it may be valuable to some advertisers to target males as opposed to females; consumers in metropolitan areas as opposed to rural or suburban areas; or consumers in the morning as opposed to afternoon or nighttime, etc.

As a specific example, a coffee shop (an advertiser) targeting a younger crowd could pay the aggregator a different price for three different advertisement products. The first advertising product could be centrally placed in line with the text of a document or electronic display, which document or electronic display is delivered to consumers at any time of day, in the demographics 18-35 year old males or females. A second product could be the exact same as the first product, except that the advertisement is delivered to 36-55 year olds. A third product could be the same as the first and second products except that the advertisement is delivered to person over 56 years old. Assuming that the coffee shop has already determined that it would like to target younger crowds, the coffee shop could pay a higher price for each advertisement delivered to an 18-35 year old consumer (the first advertisement product), and a lower price for each advertisement that is delivered to consumers over 55 years old (the third advertisement product). In this example each of the three advertisement products has a different value to the advertiser, and therefore, an optimal price can be set so the benefit to the advertiser is more accurately reflected by the price the advertiser pays for the advertising campaign. For example, the coffee shop may be willing to pay twice as much for each advertisement delivered to an 18-35 year old consumer in comparison to the price the advertiser would be willing to spend for each advertisement that is delivered to a 36-55 year old consumer. Furthermore, the coffee shop could decide that it does not want to pay anything for delivery of its advertisements to older consumers and simply not purchase the second and third advertisement products, and accordingly have no advertisements delivered to that demographic, while still paying for advertisements delivered to younger consumers. In this way, the differentiation in advertisement products enables the advertiser to customize its marketing campaigns, while the differentiation in price between the advertisement products enables the aggregator to get fairly compensated for its services. It should be appreciated that varying any of the six factors discussed above, or any other factor considered to be relevant to the success of an advertising campaign, creates a different advertising product which may have a different optimal price, and therefore a near limitless number of advertisement products could be offered by the aggregator, depending on the variety that the aggregator wishes to offer.

Figure 2:
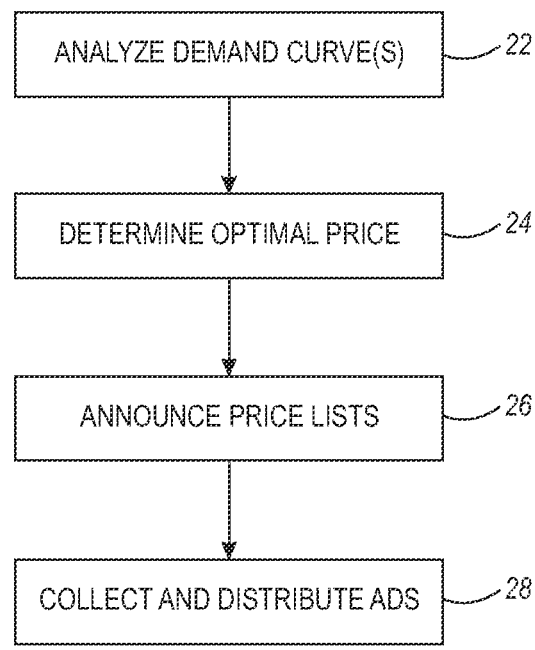
FIG. 2 is a flow chart depicting the actions taken by an optimizer in the environment of FIG. 1.

FIG. 2 shows a flow chart of the general overview the method performed by the optimizer in order to establish the relationship of the entities shown in environment 10 of FIG. 1. First, in step 22, the optimizer obtains and analyzes demand curves for each advertisement product. It is not germane to the invention how the demand curves are generated. For example, the demand curves could be generated by the optimizer, aggregator, advertiser, or other third party according to known economic principles of supply and demand. As discussed above, each advertisement product relates to various market, demographic, historical, and/or spatial-temporal factors. From the demand curve, the optimizer then determines the optimal price, as further described below, for each advertising product (step 24). The optimizer then announces the price list to the aggregator, and the aggregator forwards the information to the advertisers (step 26). Finally, the aggregator collects and stores advertisements from each advertiser corresponding to each advertisement product that is purchased from the aggregator, and distributes the advertisements to consumers on an as-needed basis (step 28). Steps 22-28 are repeated as often as desired or as necessary to keep the price lists up to date and accurate based on changes in demand for certain products. It should be appreciated that in the event that the optimizer and aggregator are the same entity, then the optimizer would announce the prices to the advertisers and collect payment from the advertisers.

For example, consider that each advertisement product can be defined by a vector comprising marketing factors (such as the six factors discussed above). For example, the vector for product 'a' may be denoted as a=(a1, a2, a3, a4, a5, a6) where a1 corresponds to the level of PCT/DCT, a2 corresponds to the advertisement placement, a3 corresponds to the keywords, a4 corresponds to the time of delivery, a5 corresponds to the location of delivery, and a6 corresponds to the demographics of the consumer. Based on the vector a, an optimal price, price $p_a$, for advertisement product 'a' will be determined, as discussed in more detail below. Referring back to FIG. 1, it can be seen that advertisers 16a, 16b, 16c, and 16d each pay aggregator 14 price $p_a$ for advertisement product 'a'. Each of advertisers 16 also transfer the advertisements that the advertisers would like to correspond to advertisement product 'a'. It should be appreciated that the same advertiser may pay for multiple advertisement products, and that, as shown, multiple advertisers pay or compete for the same advertisement product. In one embodiment, price $p_a$ is paid to the aggregator each time an advertisement is delivered to a consumer in accordance with the parameters of the advertisement product. In another embodiment, the price $p_a$ or a multiple of the price is paid upfront for a predetermined amount of time or number of deliveries to consumers. For example, advertisement product 'a' could be related to basketball shoes, targeting the demographic of 16-30 year old males, and the advertisers 16a-16d could be, e.g., Nike, Converse, Adidas, Reebok, etc. In this example, each advertiser would pay the aggregator price $p_a$ every time a basketball shoe advertisement from the advertiser is delivered to a 16-30 year old male consumer. It should be appreciated that in this example, the advertisers may not wish to specify any other factors but the targeted consumer age group (i.e., 16-30 years old), the keyword/category of the goods (i.e., basketball shoes), and the targeted gender of the consumer (i.e., male).

In the shown embodiment, after receiving the advertisements and subsequent payment(s) $p_a$ from each advertiser, the aggregator pays optimizer 12 a portion of a sum of the collected revenue. For example, the portion paid to optimizer 12 may take the general form $\Sigma(\alpha * p_a)$, where $\alpha$ is a weighting factor between zero and one for defining the percentage of revenue which is paid to the optimizer for the optimizer's services. In other words, the aggregator pays to the optimizer a percentage of the sum of all revenue collected from the advertisers in exchange for the optimized price lists. The weighting factor $\alpha$ (amount shared with the optimizer) may vary from product to product. If the optimizer and the aggregator are the same entity, then $\alpha$ is irrelevant, because the optimizer/aggregator entity would keep all revenue. After delivery to aggregator 14, the advertisements from advertisers 16 are next forwarded to MFDs 18 so that the advertisements are accessible by consumers 20. The optimizer may subsidize the cost of printing and/or transferring advertisements by paying the operator or owner of the MFDs for the costs of printing. For example, the amount paid to the MFD fleet operator may take the general form $\beta\pi(p_a)$, where $\beta$ is a weighting factor similar to $\alpha$, between zero and one for defining the percentage of proceeds which are paid to the MFD operator to cover the costs of printing documents and/or transferring data, and where $\pi(p_a)$ is the profit of the optimizer at price $p_a$. If the optimizer owns or controls the MFDs, then $\beta$ is irrelevant, and the optimizer would simply pay the cost of printing/displaying, deducting this cost from its profits. For example, the profit is instead defined as $(\Sigma\alpha p - \Sigma c_a)$, where $c_a$ is the cost to print/display each advertisement. In some aspects, the aggregator subsidizes the cost of printing/displaying. In other aspects, the consumer pays for the cost of printing/displaying the advertisements. It should be appreciated that the above examples are written with respect to a single product, product 'a', and that the total profit and/or costs for the various entities would be determined by further summing all the values corresponding to all advertisement products. For example, if an advertiser purchased products 'a' and 'b', then the profit of the optimizer may be defined generally as $\pi(p)=\pi(p_a)+\pi(p_b)=(\Sigma\alpha_a p_a - \Sigma c_a)+(\Sigma\alpha_b p_b - \Sigma c_b)$.

Figure 3:
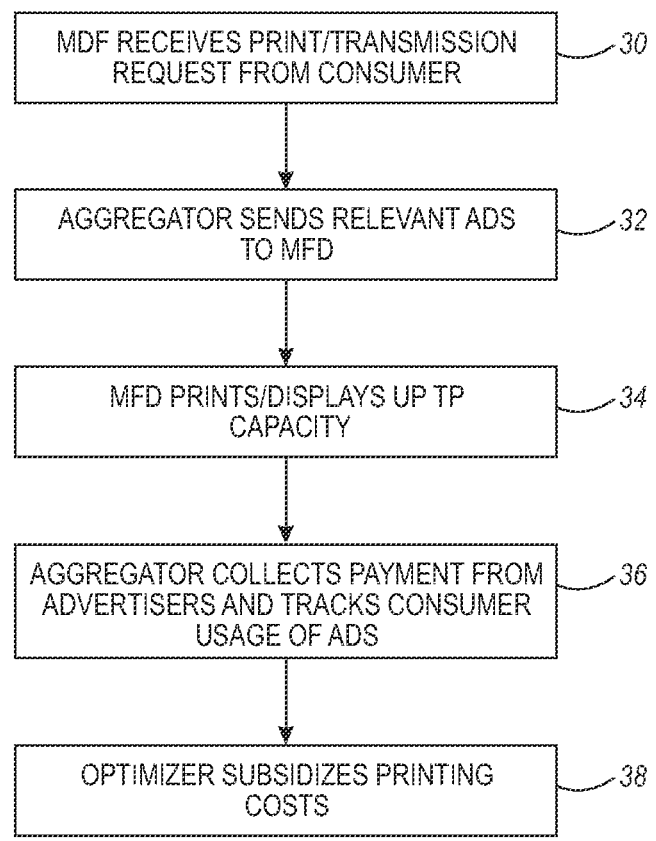
FIG. 3 is a flow chart detailing the relationship of the entities shown in the environment of FIG. 1.

In view of FIGS. 1 and 3, consumer 20 first accesses one of MFDs 18 and performs an action on or with the MFD that is interpreted as a request for an advertisement (step 30). For example, the MFD could be a consumer's home PC and the action could be the consumer performing a search with a search engine or accessing a webpage over the internet; the MFD could be a web enabled cell phone and the action could be the consumer writing or opening an email; the MFD could be a kiosk in a shopping mall and the consumer could be requesting a map of the mall; the MFD could be printer/scanner/copier and the consumer could be scanning a document, etc. It should be appreciated that virtually any action taken by a consumer with respect to an MFD could be interpreted as a request for delivery of an advertisement to the consumer, and that additional examples are provided in the patent references that were previously incorporated herein. In some aspects, the consumer is requesting a printed document (e.g., newspaper article, map, personal shopping list, etc.) and the document prints along with an advertisement on the document. In other aspects, the advertisement prints on a separate document. In other aspects, the consumer is accessing an electronic document, webpage, email, text message, etc., and the advertisement is displayed along with the electronic transmission. In any case, the MFD may "read" any text associated with the electronic or printed document (e.g., the actual text on the document, the file name of the document, metadata associated with the document, etc.) using known techniques (e.g., optical character recognition). With respect to some advertisement products, the advertisements may be general to the population at large (e.g., for a new television show or movie with mass appeal), so that any action performed by the consumer may result in the display or transmission of the advertisement. The MFD may track information related to the consumer and the consumer's past purchases and advertisement usage history in order to target the consumer with advertisements in the future (e.g., device click-through).

Upon receiving the request for an advertisement or action interpreted as a request for an advertisement, the aggregator forwards the relevant advertisements to the MFD, so that they can be printed and/or displayed (step 32). The advertisements are determined to be relevant by comparing the statistics of the consumer (e.g., age, location, etc.), the time of day, the keywords, etc., to the parameters of the different advertisement products. If the various user statistics and keywords match any of the advertisement products, then the advertisements associated with those advertisement products are forwarded to the consumer. For example, referring back to advertisement product related to basketball shoes described above, the MFD may take known data that the consumer is an 18 year old male (e.g., requiring the consumer to log into a pre-established user account with a login name and password), with a history of purchasing athletic equipment, and therefore provide the consumer with advertisements, coupons, etc., for new basketball shoes since the consumer meets the parameters for the advertisement product.

In step 34 it is noted that only a certain number of advertisements can be printed or displayed at a single time, whether on a single physical document or electronic display. Thus, any additional advertisements will not be printed/displayed if capacity is met, because the aggregator can not sell more advertisements than there is demand, $d_a(p_a)$, of the advertisement product at price $p_a$, or more than capacity, $Q_a$, of advertisements that the MFDs can print per consumer request (e.g., the maximum number of advertisements that can be displayed in the available space of a printed document). For this reason, the total number of "sales" made per print/display request is the lesser of the demand or the capacity, or generally of the form $\min\{d_a(p_a), Q_a\}$. For example, if the demand of advertisements at price $p_a$ is ten advertisements, but the capacity is only five advertisements, then the capacity will define the number of ads which can be printed/displayed per each request. Oppositely, if the demand is only five advertisements, and the capacity is ten advertisements, then the demand would limit the number of sales. For example, the expected profit per print request of advertisement product 'a' may generally take the form $\pi_a(p_a)=(\alpha p_a-c_a)*\min\{d_a(p_a), Q_a\}$. Assuming that demand decreases with price, it follows that $d_a(p_a)$ is a decreasing function. Also letting $r_a$ be the profit function without a capacity limitation, $r_a(p_a)=(\alpha p_a-c_a)*d_a(p_a)$, it is also assumed that the decreasing nature of the demand curve, $d_a(p_a)$, results in a concave curve for $r_a(p_a)$, which curve would have exactly one clearly determinable maximum. Since capacity is not taken into account with respect to profit function r(p), this is generally referred to as the unlimited capacity profit function. With these assumptions, it follows that an optimal solution for $\pi_a(p_a)$ can be defined at one of two points: (1) the maximum of the unlimited capacity profit function r(p), which corresponds to an price $p^0$; or (2) the intersection of demand and capacity ($d_a(p_a)=Q_a$), which corresponds to stock-clearing price $p^Q$. When used herein, the "stock clearing price" will refer to the price at which demand meets the capacity, or where $d_a(p_a)=Q_a$. Generally, according to the above, profit is optimized for each advertising product 'a' by setting price $p_a$ equal to the greater of $p_a^Q$ and $p_a^0$.

Figure 4:
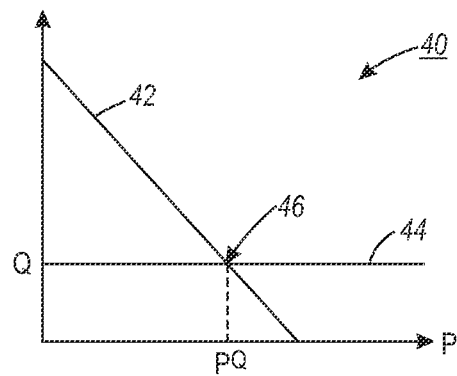
FIG. 4 is a demand curve showing a stock-clearing price.
Figure 5:
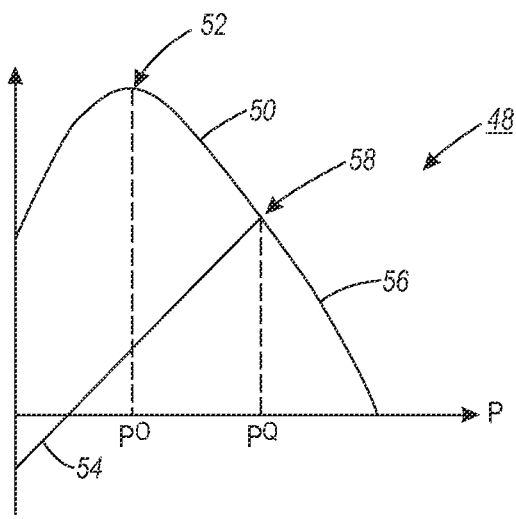
FIG. 5 is a first profit curve showing an optimal price and a stock-clearing price; and, FIG. 6 is a second profit curve showing an optimal price and a stock-clearing price.

For example, graph 40 in FIG. 4 illustrates demand curve 42 (e.g., d(p) for any given product, such as advertisement product 'a'). Line 44 is included to represent the capacity Q for the given product. Intersection 46 illustrates the point at which demand meets capacity, thereby defining stock-clearing price $p^Q$. Graph 48 in FIG. 5 illustrates a scenario wherein the stock-clearing price is the optimal price. In the example of graph 48, the unlimited capacity profit function r(p) is defined by segments 50 and 56. Maximum 52 of the profit function r(p) identifies the price $p^0$. The stock clearing price pQ is identified where segment 54, having the general form $(\alpha p_a-c_a)*Q$, intersects with the ideal profit function r(p) at intersection 58. Since the profit function is determined by the lesser of the capacity or the demand, the profit function $\pi(p)$ comprises segment 54 (limited by the capacity) and segment 56 (limited by the demand). Since the capacity would be exceeded, and therefore impossible, if the price were set to $p^0$, profit is instead maximized by selecting stock clearing price $p^Q$.

Figure 6:
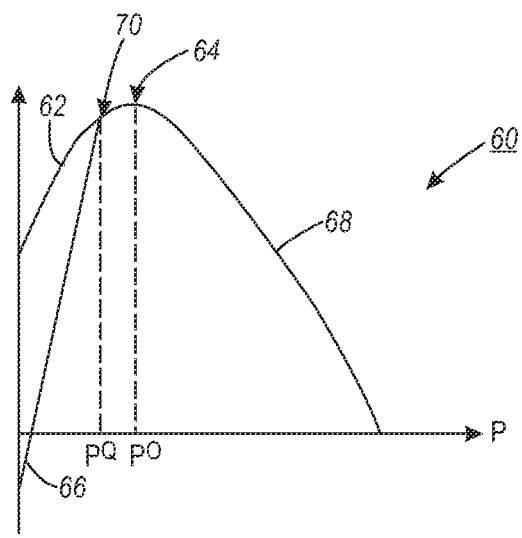

Graph 60 in FIG. 6 illustrates a scenario wherein the stock-clearing price is not the optimal price. In the example of graph 60, the unlimited capacity profit function r(p) is defined by segments 62 and 68. Maximum 64 of the profit function r(p) identifies the price $p^0$. The stock clearing price $p^Q$ is identified where segment 66, having the general form $(\alpha p_a-c_a)*Q$, intersects with the ideal profit function r(p) at intersection 70. Since the profit function $\pi(p)$ is determined by the lesser of the capacity and the demand, the profit function $\pi(p)$ comprises segment 66 (limited by the capacity) and segment 68 (limited by the demand). Since there would be sufficient capacity to meet demand at $p^0$, profit is maximized by selecting price $p^0$.

Again, although the current disclosure and embodiments refer primarily to printed documents containing advertisements, that the advertisements/communications need not be printed, and that any communications in general could be used in place of advertisements. For example, a consumer may receive a text message, email, photo message, etc., on a mobile phone or PDA, which provides the targeted communication.

It will be appreciated that variations of the above-disclosed embodiments and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-based method for optimizing a price for delivering at least one communication from an advertiser to a consumer, said method comprising:
    (a) defining, using computer hardware and software, an advertisement product with at least one parameter;
    (b) obtaining, using the computer hardware and software, a demand curve for said advertisement product;
    (c) calculating, using the computer hardware and software, a first profit function as a function of said demand curve;
    (d) calculating, using the computer hardware and software, a second profit function as a function of a capacity of communications that can be delivered to said consumer;
    (e) determining, using the computer hardware and software, a first price at a maximum of said first profit function;
    (f) determining, using the computer hardware and software, a second price at an intersection of said first profit function with said second profit function;
    (g) determining, using the computer hardware and software, as an optimal price a greater of said first and second prices; and,
    (h) delivering, using the computer hardware and software, said optimal price to said advertiser, an aggregator for said advertiser, or combinations thereof, audibly, visibly, as a printed document, or combinations thereof, through a multi-function device.

2. The method for optimizing recited in claim 1, wherein said second profit function is calculated having a general form $(\alpha p-c)*Q$, where $\alpha$ is a weighting factor between zero and one, p is a price of said advertisement product, c is a cost to deliver said advertisement product, and Q is said capacity of communications which can be delivered to said consumer.

* * * * *